(12) United States Patent
Goetz et al.

(10) Patent No.: US 7,721,856 B2
(45) Date of Patent: May 25, 2010

(54) VIBRATION DAMPER HAVING AN AMPLITUDE-SELECTIVE DAMPING DEVICE

(75) Inventors: Ole Goetz, Braunschweig (DE); Kais Saadeddin, Bochum (DE); Claus Weimann, Wetter (DE); Thomas Brendecke, Peine (DE)

(73) Assignee: ThyssenKrupp Bilstein Suspension GmbH, Ennepetal (DE)

( * ) Notice: Subject to any disclaimer, the term of this patent is extended or adjusted under 35 U.S.C. 154(b) by 788 days.

(21) Appl. No.: 11/585,899

(22) Filed: Oct. 25, 2006

(65) Prior Publication Data

US 2007/0125610 A1 Jun. 7, 2007

(30) Foreign Application Priority Data

Nov. 21, 2005 (DE) .................... 10 2005 055 801

(51) Int. Cl.
*F16F 13/00* (2006.01)
(52) U.S. Cl. ............... 188/282.6; 188/282.9; 188/313; 188/322.22
(58) Field of Classification Search ... 188/282.4–282.6, 188/282.8, 282.9, 304, 305, 313, 316, 317, 188/322.13, 322.15, 322.22
See application file for complete search history.

(56) References Cited

U.S. PATENT DOCUMENTS 3,896,908 A * 7/1975 Petrak .................. 188/280

| | | | |
|---|---|---|---|
| 5,248,014 A | 9/1993 | Ashiba | |
| 6,220,409 B1 | 4/2001 | Deferme | |
| 2001/0037922 A1 * | 11/2001 | Gotz | 188/320 |
| 2004/0149530 A1 * | 8/2004 | Drees | 188/322.15 |
| 2005/0109571 A1 * | 5/2005 | Burkert et al. | 188/322.15 |
| 2005/0133319 A1 * | 6/2005 | Wilhelm | 188/281 |

FOREIGN PATENT DOCUMENTS

| | | |
|---|---|---|
| DE | 36 12 006 A1 | 10/1987 |
| DE | 3619402 A1 * | 12/1987 |
| DE | 3926704 C1 * | 9/1990 |
| DE | 100 22 029 A1 | 11/2000 |
| DE | 103 51 353 A1 | 2/2005 |
| DE | 10 2004 04 7778 A1 | 6/2005 |
| GB | 2189004 A * | 10/1987 |

* cited by examiner

*Primary Examiner*—Xuan Lan Nguyen
(74) *Attorney, Agent, or Firm*—Crowell & Moring LLP

(57) ABSTRACT

A vibration damper having a sensitive response behavior at very low amplitudes comprises a separating piston being disposed inside a bypass so as to move axially freely. The separating piston divides the bypass into two chambers mutually sealed from one another. Two valves are disposed in the bypass. The first valve acts in a compression stage as a pressure limiting valve and as a non return valve in an extension stage. The second valve acts as a pressure limiting valve in the extension stage and as a non return valve in the compression stage.

8 Claims, 4 Drawing Sheets

VIBRATION DAMPER HAVING AN AMPLITUDE-SELECTIVE DAMPING DEVICE

BACKGROUND

The invention relates to a vibration damper having an amplitude-selective damping device according to the preamble of claim 1.

A vibration damper of this type is known from U.S. Pat. No. 5,248,014. A disadvantage of this known vibration damper is that the amplitude-selective damping device is structurally complex in design. Therefore, the separating piston comprises an annular circumferential groove and radially inwardly directed through-flow channels (shutter passages) which cooperate with through-flow bores (guide passages) in the housing wall defining the space which accommodates the separating piston. Furthermore, in the case of the known vibration damper, the separating piston is supported in both axial displacement directions via springs, so that it is disposed in such a manner as to be non-freely displaceable within the space accommodating it. Therefore, a minimum force which acts hydraulically upon the separating piston is required and this force must be at least greater than the resilient force, acting against it, of the spring which supports the separating piston, in order for the separating piston to be displaced in an axial manner. If the separating piston is displaced in an axial manner, then the periphery of the separating piston cooperates with the through-flow bore which is provided in the wall defining the space which accommodates the separating piston. The bypass volume flow is divided into two partial volume flows, so that not all of the bypass volume is available for the axial displacement of the separating piston. Therefore, in the event of low-amplitude vibration excitations, the pressure acting upon the separating piston can be so low that it is not sufficient for an axial displacement of the separating piston, so that the effect of the amplitude-selective damping device does not arise. In the case of all of the embodiments of an amplitude-selective damping device, in which the separating piston is held in a centred manner by means of springs, the position of the separating piston is dependent upon the differential pressure at the separating piston and not exclusively upon the quantity of damping medium which has flowed in. In such a case, the amplitude-selective function of the damping system is dependent upon speed by reason of the volume flow-pressure interrelationship at the working piston valve.

SUMMARY OF THE INVENTION

It is the object of an invention to develop a vibration damper in accordance with the preamble of claim 1 such that the amplitude-selective damping device is formed in a structurally convenient manner and has a sensitive response behaviour even at very low amplitudes.

In accordance with the invention, this object is achieved by virtue of the fact that the separating piston is disposed inside the space so as to be able to move axially freely and the chambers are disposed in a mutually sealing manner and that the space which accommodates the separating piston is connected to the connection channels in such a manner that the entire bypass volume flow is utilised in the extension stage and in the compression stage in each case completely for the axial displacement of the separating piston inside the space.

In the case of the invention, the bypass is provided with at least two pressure limiting valves, of which one is effective in the extension stage and one is effective in the compression stage of the vibration damper. As a result, a bypass is achieved which comprises a damping characteristic which is dependent upon the design of the pressure limiting valves. At the same, time a space is also provided inside the bypass, which space is disposed hydraulically in parallel with the damping piston of the vibration damper and in which there is disposed a separating piston which can move in an axial direction and divides the space into a chamber on the piston rod-side and a chamber remote from the piston rod, wherein the piston rod-side chamber is hydraulically connected to the piston rod-side working chamber of the vibration damper, and the chamber remote from the piston rod is hydraulically connected to the working chamber, remote from the piston rod, of the vibration damper. In this manner, an amplitude-selective damping device is provided inside the bypass and becomes effective in the event of low-amplitude vibration excitations and damps these vibrations.

By reason of the fact that both an amplitude-selective damping device and pressure limiting valves, which are effective in the extension and compression stage, are disposed inside the bypass, a bypass is provided which in the extension stage and in the compression stage comprises a specifically adjustable damping characteristic for low-amplitude vibrations. As a consequence, it is possible to achieve comfortable damping adjustment without having to dispense with sufficient stabilisation properties of the vehicle body in the event of low damping speeds.

In accordance with the invention, the space which accommodates the separating piston is connected to the connection channels, which connect the chambers of the space to the working chambers of the vibration damper, such that the entire bypass volume flow is utilised in the extension stage and in the compression stage in each case completely for the axial displacement of the separating piston inside the space. In this manner, the entire bypass volume flow is available for the axial displacement of the separating piston and a particularly sensitive response behaviour of the amplitude-selective damping device is achieved. By virtue of the fact that the entire bypass volume flow is available for the axial displacement of the separating piston inside the space, the separating piston is displaced in an axial manner even in the event of vibration excitations at very low amplitudes or pressures, thus affording a particularly high level of driving comfort.

In addition to the first and second pressure limiting valves which are disposed inside the bypass, a hydraulic restrictor can be provided hydraulically in parallel with the pressure limiting valves. By virtue of this restrictor which is disposed hydraulically in parallel with the pressure limiting valves, the separating piston can be influenced by a partial volume flow, without this partial volume flow having to flow through one of the pressure limiting valves. By virtue of this type of restrictor which is connected hydraulically in parallel with the pressure limiting valves, the response behaviour of the amplitude-selective damping device is further improved because the opening pressure of the pressure limiting valve which is effective in the respective damping direction does not initially have to be overcome before the separating piston is influenced by the bypass volume flow. A particularly sensitively reacting, amplitude-selective damping system is provided in this manner.

The at least two pressure limiting valves which are disposed in the bypass of the vibration damper can each comprise different opening pressures. In this manner, different damping characteristics can be adjusted in the extension stage and in the compression stage inside the bypass. In a particular embodiment of the invention, the pressure limiting valve which is effective in the compression stage has a very low opening pressure, so that it exerts no damping effect or only a scarcely noticeable damping effect in the compression stage and acts as a non-return valve in the extension stage. The embodiment has the advantage that this type of bypass function advantageously cooperates with highly asymmetrical extension-compression ratios of the damping characteristic curves on the working piston. This applies in particular to very soft compression stage characteristic curves.

With regard to the structural configuration of the pressure limiting valves, numerous different options are available. For example, the pressure limiting valves can be formed as spring-loaded seat valves, alternatively they can also be formed as spring-loaded disc valves. Different designs of the pressure limiting valves are also possible in the extension stage on the one hand and in the compression stage on the other hand.

The separating piston comprises on its axial end surfaces elastic stop buffers. These stop buffers can comprise specifically adjusted resiliency properties, so that according to a specific spring suspension, the separating piston runs up against the axial stops which define the space accommodating the separating piston. The stops which are effective in the axial direction can be formed as stop buffers which are disposed on the respective axial end sides of the separating piston and which consist e.g. of elastomer. As an alternative, only one single stop buffer can be provided which passes through an opening in the separating piston and protrudes on both axial end sides of the separating piston, so that a stop buffer for the separating piston is formed on both axial sides. If the separating piston lies with its stop buffers against the respective stop and thus reaches its axial end position, the bypass is switched off, i.e. no more damping fluid flows through the bypass.

The entire amplitude-selective damping device can be integrated into a housing which is connected to the piston rod.

BRIEF DESCRIPTIONS OF THE DRAWINGS

The invention will be explained in detail hereinunder with reference to a drawing which illustrates an exemplified embodiment. In detail, FIG. 1 shows an axial half section of a vibration damper in accordance with the invention according to a first embodiment;

DETAILED DESCRIPTION OF THE INVENTION

Figure 5:
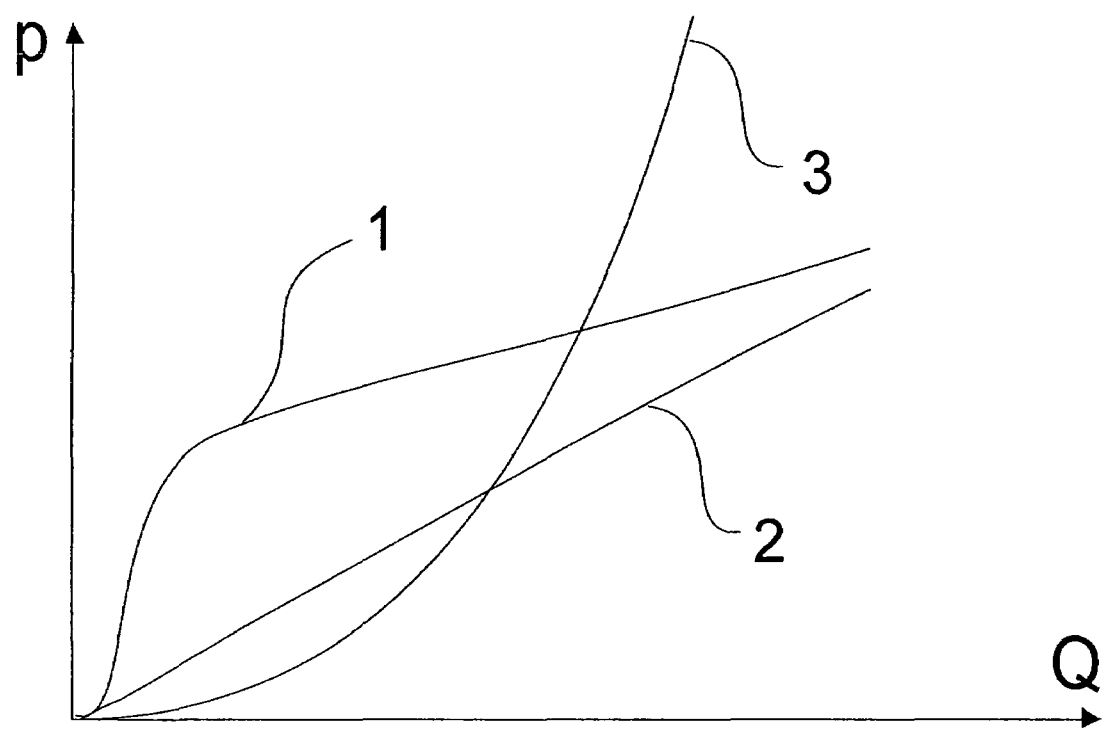
FIG. 5 shows a graph to explain the effect of the amplitude-selective damping device in accordance with the invention.

The mode of operation of the amplitude-selective damping device in accordance with the invention will first be explained with reference to FIG. 5. FIG. 5 illustrates a p-Q-graph depicting different pressure-volume flow characteristic curves. The characteristic curve which is designated by the number 3 is parabolic and represents the characteristic curve of a simple hydraulic restrictor. The bypass of a conventional amplitude-selective damping device which does not comprise any additional pressure limiting valves would have this type of characteristic curve progression. In comparison, the characteristic curve which is designated by the number 1 shows the typical characteristic curve progression of a pressure limiting valve having degressive damping behaviour. The characteristic curve which is designated by the number 2 is to be viewed as a special case and represents the characteristic curve of a pressure limiting valve having a linear damping characteristic.

The graph of FIG. 5 shows clearly that an amplitude-selective damping device which is disposed hydraulically in parallel with the working piston of the vibration damper and includes merely a simple hydraulic restrictor produces, by reason of the parabolic characteristic curve progression of the hydraulic restrictor, only minimal damping forces during low volume flows but in contrast produces high and substantially progressively increasing damping forces during high volume flows, thus adversely affecting travel comfort. In contrast thereto, the characteristic curves 1 and 2 also comprise significantly lower pressures or damping forces even during comparatively high volume flows of the damping fluid. Within the scope of the invention, this is exploited by virtue of the fact that pressure limiting valves e.g. with characteristic curve progressions as shown in curves 1 and 2 of the graph of FIG. 5 are additionally disposed within the bypass which comprises an amplitude-selective damping device. In this manner, by reason of the parallel connection of the bypass equipped in this manner to the damping valve on the working piston of the vibration damper, it is possible to achieve improved properties of the amplitude-selective vibration damper compared to a bypass which has a constant restrictor.

Figure 1:
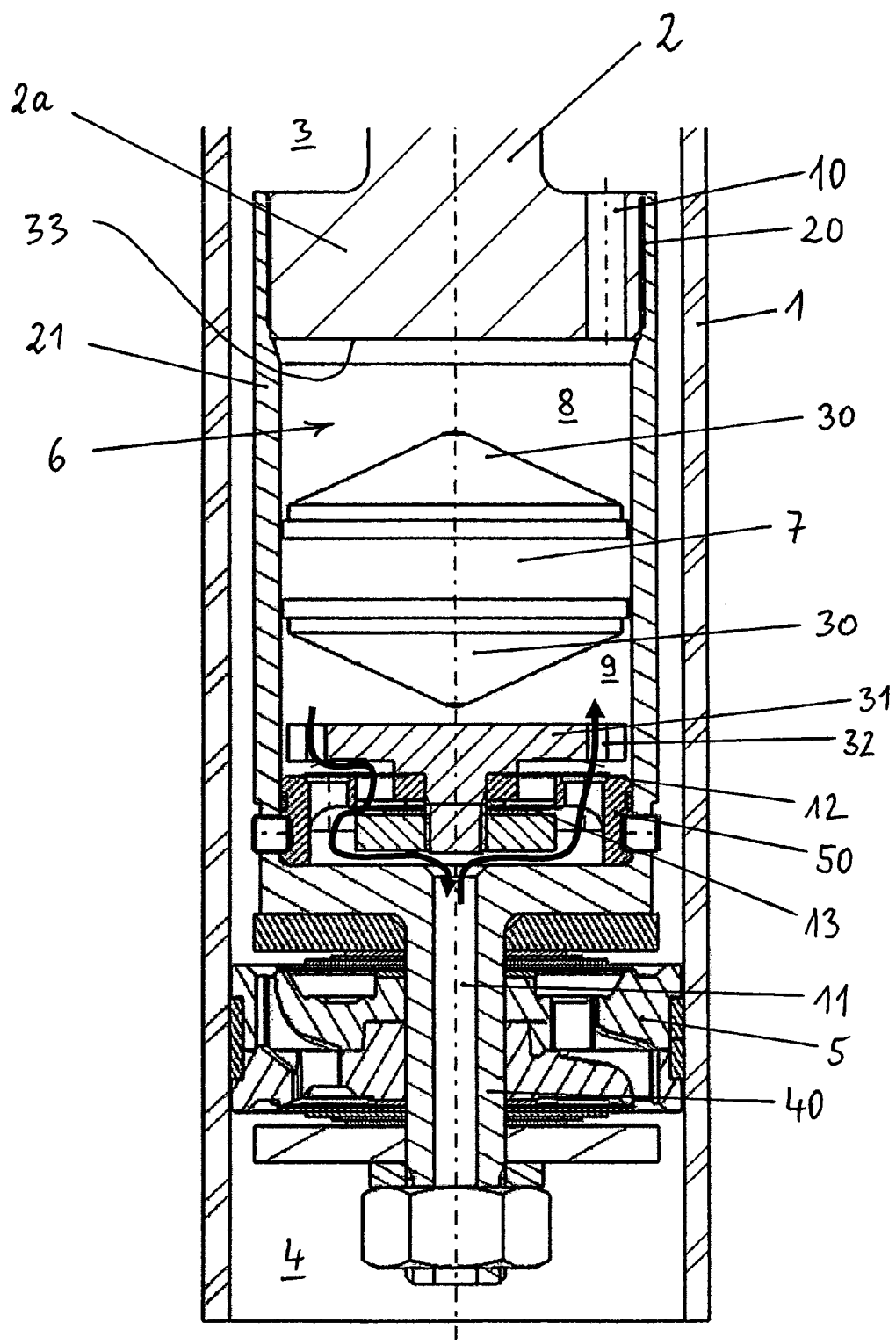

FIG. 1 schematically illustrates an axial half section of a first embodiment of the vibration damper in accordance with the invention The arrows extending in different directions indicate different through-flow directions of the pressure limiting valves 12, 13 provided inside the bypass. The right-hand side of FIG. 1 illustrates the through-flow direction for the compression stage, whereas the left-hand side of FIG. 1 illustrates the through-flow direction for the extension stage.

A damping piston 5 is guided inside the damper tube 1 so as to be able to move in an oscillating manner. This damping piston 5 divides the inner space of the damper tube 1 into a piston rod-side working chamber 3 and a working chamber 4 remote from the piston rod. A housing which comprises a housing wall 21 is connected to the piston rod 2 via a thread 20. Disposed inside the housing is a separating piston 7 which divides the space 6, which is enclosed by the housing wall 21, into a piston rod-side chamber 8 and a chamber 9 remote from the piston rod. The separating piston 7 is disposed inside the space 6 in such a manner as to be able to move freely in an axial direction, i.e. no spring elements or the like are provided which hold the separating piston 7 in a fixed axial non-operative position when the separating piston is not influenced by a bypass volume flow.

Disposed on the axial end sides of the separating piston 7 are stop buffers 30 which consist of elastic material, such as e.g. rubber or elastomer material. By means of these stop buffers 30, the separating piston 7 strikes resiliently in an axial direction and thus softly against the respective stop surfaces which define the space 6 in an axial direction. On the piston rod-side, a stop surface is formed by means of a planar end surface 33 of the piston rod, whereas the stop surface on the side remote from the piston rod 2 is formed inside the chamber 9 by means of a stop disc 31 which comprises bores 32 for the passage of damping fluid.

In the illustration as shown in FIG. 1, a spigot 40 is provided below the amplitude-selective damping device comprising the space 6 and the separating piston 7, wherein the master damping piston of the vibration damper is disposed on said spigot in a manner which is known per se. The spigot 40 is part of the bypass and comprises a central bore which forms a hydraulic connection channel 11, via which the working chamber 4 which is remote from the piston rod is connected to the chamber 9, remote from the piston rod, of the space 6. In a comparable manner, the piston rod-side working chamber 3 is connected to the piston rod-side chamber 8 of the space 6 via an inlet bore which is disposed in a radial shoulder 2a of the piston rod 2. This inlet bore thus forms the hydraulic connection channel 10 between the piston rod-side working chamber 3 and the piston rod-side chamber 8 and thus comprises such a large diameter that its restricting action is negligible.

A valve element which comprises at least two pressure limiting valves 12, 13 is disposed inside the bypass on the end of the chamber 9 remote from the piston rod 2. The valve element comprises a valve support 50 and valve discs which are disposed thereon. In FIG. 1, one pressure limiting valve 12 is effective in the compression stage of the vibration damper, whereas the other pressure limiting valve 13 is effective in the extension stage of the vibration damper.

The mode of operation of the amplitude-selective damping device in accordance with the invention will be described hereinunder with reference to damping in the compression stage and in the extension stage:

On the right-hand side of FIG. 1 the arrow indicating the flow of the damping medium serves to illustrate the through-flow which occurs in the compression stage of the vibration damper, i.e. when the damping piston 5 in FIG. 1 is moved downwards. In this case, damping fluid flows starting from the working chamber 4 remote from the piston rod, through the connection channel 11 provided inside the spigot 40 in the direction of the chamber 9. On its flow path, the damping medium impinges upon the pressure limiting valve 12, so that a damping effect is achieved by means of this pressure limiting valve 12. After the damping fluid has passed through the pressure limiting valve 12, it passes through bores 32 disposed in a stop disc 31 and into the chamber 9 of the space 6, in which the separating piston 7 is guided in an axially displaceable manner. The entire bypass volume flow of the compression stage impinges upon the end surface of the separating piston 7 remote from the piston rod 2 and effects an axial displacement of the separating piston 7 inside the space 6 in the direction of the piston rod 2.

Figure 3:
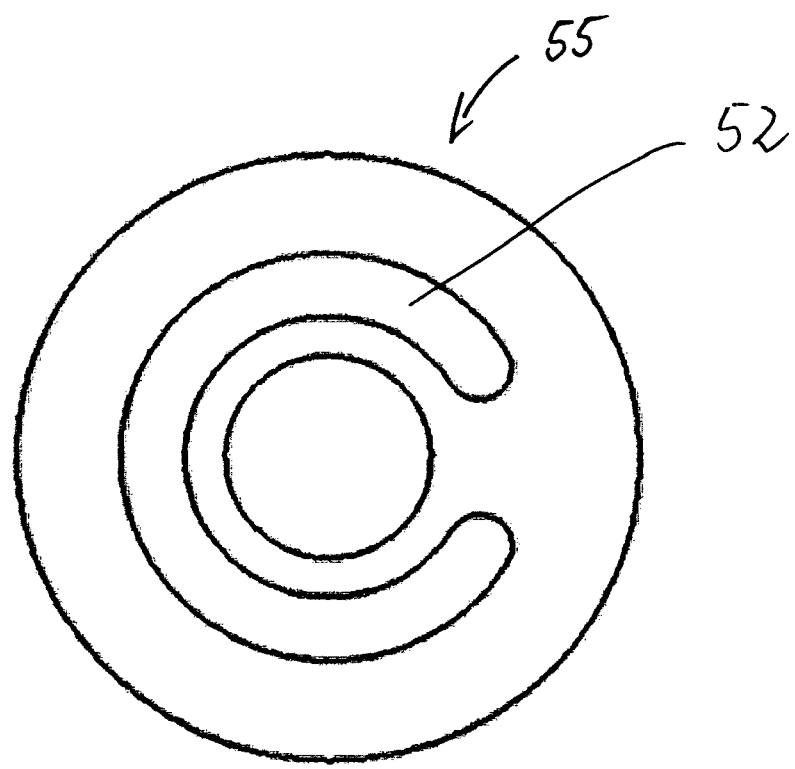
FIG. 3 shows a bypass disc for the extension stage in a first embodiment (omega disc)

The valve disc arrangement which forms the pressure limiting valve 12 is provided with a so-called omega disc 55 which is illustrated on an enlarged scale in FIG. 3. Discs of this type owe their name to the omega-like or C-shaped cut-out 52 which is provided within the surface of this disc. This cut-out 52 provides a through-flow cross-section for the damping fluid which is permanently open in the extension direction. Only when the pressure exerted by the damping fluid upon the pressure limiting valve 12 is sufficiently great does the pressure limiting valve 12 open. In parallel therewith, even when the pressure limiting valve 12 is closed, there is provided a permanent bypass volume flow through the permanently open free through-flow cross-section of the bypass disc 54 which is disposed inside the extension stage valve 13, so that even at very low amplitudes of the vibration excitation, at which the pressure limiting valve 12 or the extension stage valve 13 has not even reached its opening pressure, there is provided a bypass volume flow which effects an axial displacement of the separating piston 7. In this manner, an amplitude-selective damping device is achieved which is particularly sensitive and which becomes effective even at extremely low amplitudes of the vibration excitation.

Figure 4:
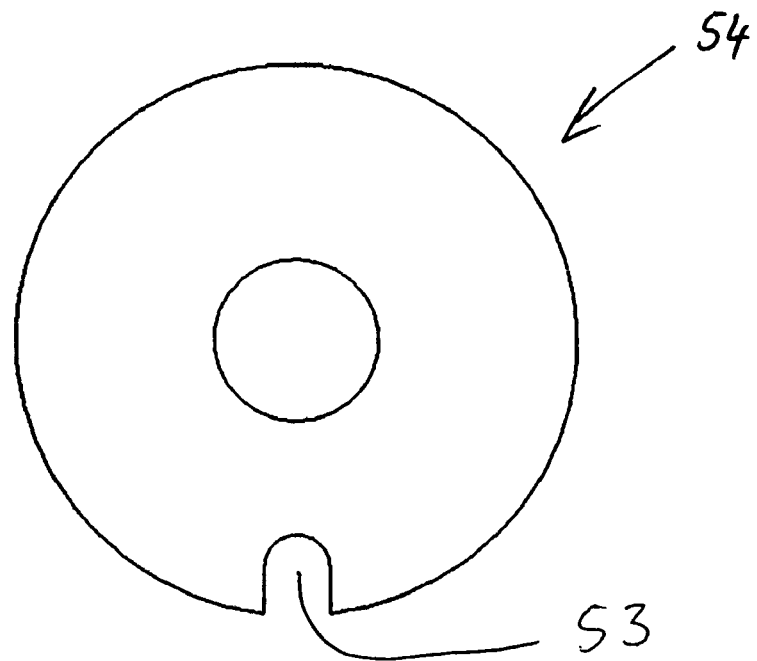
FIG. 4 shows a bypass disc for the compression stage according to a second embodiment.

The left-hand side of FIG. 1 illustrates the mode of operation of the amplitude-selective damping device in accordance with the invention in the extension stage. Damping fluid flows from the piston rod-side working chamber 3 through the hydraulic connection channel 10, which is formed as an inlet bore, into the chamber 8 of the space 6 and acts upon the end surface of the separating piston 7 facing the piston rod 2. As a consequence, the separating piston 7 is displaced inside the space 6 in the direction of the damping piston 5. By virtue of this displacement, the damping fluid located in the chamber 9 is urged through the pressure limiting valve 13 into the hydraulic connection channel 11 and flows via this connection channel 11 into the working chamber 4 which is remote from the piston rod. In this manner, the pressure limiting valve 13 achieves a damping effect inside the bypass. Disposed inside the valve disc arrangement of the pressure limiting valve 13 is a bypass disc which is illustrated in an enlarged manner in FIG. 4 and which comprises on its outer periphery a cut-out 53 which can be freely selected in terms of its shape. This cut-out 53 represents a through-flow cross-section, which is permanently open for damping fluid, in the sense of a hydraulic restrictor. Therefore, even at very low pressures at the pressure limiting valve 13 which are present in the event of vibration excitations at very low amplitudes or pressures, damping fluid is able to flow through the permanently open restrictor cross-section of the bypass disc when the pressure limiting valve 13 is closed. In this manner, an amplitude-selective damping device is achieved which is sensitive and becomes effective even at very low amplitudes or pressures of the vibration excitation.

In both of the through-flow directions explained above, it is ensured in each case that the entire bypass volume flow is always completely available for the axial displacement of the separating piston 7 inside the space 6, whereby even low amplitudes of the vibration excitation produce a bypass volume flow which serves to achieve an axial displacement of the separating piston 7 and thus amplitude-selective damping.

Figure 2:
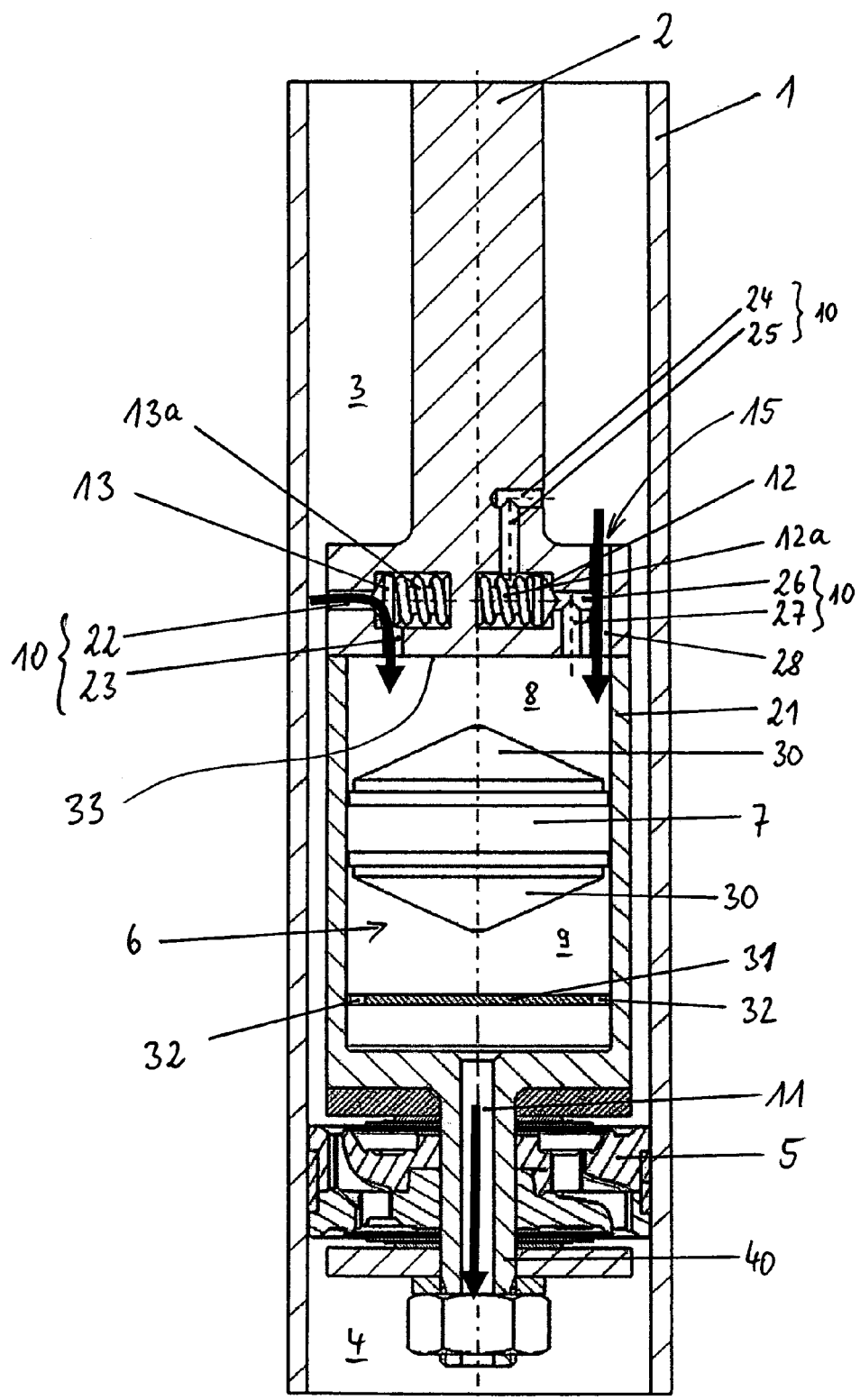
FIG. 2 shows an axial half section of a vibration damper in accordance with the invention according to a second embodiment.

FIG. 2 illustrates a second embodiment of the amplitude-selective damping device in accordance with the invention. Like components are designated by like reference numerals, as in FIG. 1. In comparison to the exemplified embodiment as shown in FIG. 1, the most important difference resides in the fact that the pressure limiting valves 12, 13 are not formed as disc valves but rather as spring-loaded seat valves.

The separating piston 7 is disposed inside the space 6 in such a manner as to be freely displaceable in the axial direction and divides the space 6 into the piston rod-side chamber 8 and the chamber 9 remote from the piston rod. On its periphery, the separating piston 7 lies in a sealing manner against the housing wall 21, so that the two chambers 8, 9 are sealed with respect to each other (similar to the embodiment as shown in FIG. 1).

In FIG. 2, the flow arrows shown illustrate how the damping fluid flows through the amplitude-selective damping device during extension stage damping.

In FIG. 2, the connection channel 10, by means of which the piston rod-side working chamber 3 is connected to the piston rod-side chamber 8 of the space 6, is formed by bores 22, 23, 24, 25, 26, 27 which are provided in the piston rod 2. The bores 22 and 23 connect the piston rod-side working chamber 3 or the piston rod-side chamber 8 to a cavity, in which the pressure limiting valve 13 which is formed as a spring-loaded seat valve is disposed. In the embodiment as shown in FIG. 2, this pressure limiting valve 13 comprises a conical valve body which cooperates with the bore 22 as a valve seat. During an extension stage movement of the piston rod 2, the conical valve body of the pressure limiting valve 13 lifts against the spring force of the restoring spring 13a when the opening pressure of this pressure limiting valve 13 as determined by this restoring spring 13a is achieved.

The pressure limiting valve 12 likewise comprises a restoring spring 12a which determines the opening pressure of this pressure limiting valve.

The pressure limiting valve which in FIG. 2 is designated by the reference numeral 12 is effective in the compression stage of the vibration damper and acts as a non-return valve during an extension stage movement of the piston rod. In the embodiment as shown in FIG. 2, the axially extending bore 28 forms a hydraulic restrictor 15. The axial bore 28 provides for the damping fluid a permanently open through-flow opening with a hydraulic restricting effect, so that whilst bypassing the pressure limiting valves 12, 13, the damping fluid is able to flow directly out of the piston rod-side working chamber 3 into the piston rod-side chamber 8 and vice versa.

A stop disc 31 having through-flow bores 32, which are distributed over the periphery, for the damping fluid are disposed in the chamber 9, remote from the piston rod, of the space 6. The stop disc 31 serves as a stop for the separating piston 7. If, during an extension stage movement of the piston rod 2, the separating piston 7 reaches its axial end position inside the space 6, then the separating piston 7 lies with its stop 30, remote from the piston rod, against the stop disc 31, so that the bypass is switched off. The same principle applies in a similar manner to the compression stage movement of the piston rod. Whenever the separating piston 7 reaches its axial end position inside the space 6 and no longer moves, the bypass is switched off, so that the damping piston 5 of the vibration damper exclusively has to assume the task of damping vibrations.

It is understood that the seat valves which are illustrated in FIG. 2 can also be formed with a different construction. For example, the restoring springs 12a, 13a can be disposed inside the valve slide instead of surrounding the valve slide, as illustrated in FIG. 2.

The restricting effect of the restrictor 15 is adjusted by the cross-section of the bore 28. As an alternative, it is also possible to provide a fixed diaphragm inside the bore 28, in order to adjust the desired flow resistance.

In a further, not illustrated embodiment of the invention, the bore 28 can be replaced by a permanently open opening in the control edge which cooperates with the valve body of the pressure limiting valve 12, i.e. with the valve seat for the valve body of the pressure limiting valve 12. For this purpose, the control edge of the valve seat has a permanently open opening which cannot be acted upon in a sealing manner by the valve body of the pressure limiting valve 12. In this manner, a permanently open flow connection is provided between the piston rod-side working chamber 3 and the piston rod-side chamber 8 and vice versa, said flow connection forming a hydraulic restrictor which is effective hydraulically in parallel with the pressure limiting valves. The same formation of the restrictor can also be provided on the pressure limiting valve 13.

In a compression stage movement of the piston rod 2, the function of the seat valves 12, 13 is reversed. In this case, the pressure limiting valve 12 opens and the valve slide of the pressure limiting valve 13 acts as a non-return valve. The volume flow flowing through the bore 28 is reversed in comparison with the arrow direction shown in FIG. 2. In this case, the pressure limiting valve 12 exerts a damping effect until the separating piston 7 has reached its axial end position and lies against the planar end surface of the piston rod 2 with its piston rod-side stop 30. If the separating piston 7 has reached its axial end position, then it lies against the planar end surface of the piston rod 2 and the bypass is switched off. The damping action of the vibration damper is then assumed exclusively by the damping piston 5.

LIST OF REFERENCE NUMERALS 1. damper tube
2. piston rod
2a. radial shoulder
3. working chamber
4. working chamber
5. damping piston
6. space
7. separating piston
8. chamber
9. chamber
10. connection channel
11. connection channel
12. pressure limiting valve
12a. restoring spring
13. pressure limiting valve
13a. restoring spring
15. restrictor
20. thread
21. housing wall
22. bore
23. bore
24. bore
25. bore
26. bore
27. bore
28. bore
30. stop buffer
31. stop disc
32. through-flow bore
33. end surface
40. spigot
50. valve support
52. cut-out
53. cut-out
54. bypass disc
55. omega disc

The invention claimed is:

1. Vibration damper having an amplitude-selective damping device, comprising
   a) a damper tube which is filled with damping fluid and in which a piston rod is disposed in such a manner as to be able to move in a reciprocating manner, said piston rod supporting a damping piston which divides the inner space of the damper tube into a piston rod-side working chamber and a working chamber remote from the piston rod,
   b) a space to receive damping fluid, which space is disposed inside a bypass provided between the working chambers and hydraulically in parallel with the damping piston and in which an axially moveable separating piston is disposed which divides the space into a piston rod-side chamber and a chamber remote from the piston rod,
   c) wherein the bypass comprises at least a first hydraulic connection channel, via which the piston rod-side working chamber is connected to the piston rod-side chamber, and at least a second hydraulic connection channel, via which the working chamber remote from the piston rod is connected to the chamber remote from the piston rod, and wherein inside the bypass at least two valves are disposed, of which one is effective in the extension stage and one is effective in the compression stage characterized in that d) the separating piston is disposed inside the space so as to be able to move axially freely and the chambers are disposed in a mutually sealing manner,
e) the first valve acts in the compression stage as an admission valve without a pressure limiting effect or as a pressure limiting valve and acts in the extension stage as a non-return valve,
f) the second valve acts in the extension stage as a pressure limiting valve and acts in the compression stage as a non-return valve,
g) and the space accommodating the separating piston is connected to the connection channels such that the entire bypass volume flow is utilised in the extension stage and in the compression stage in each case completely for the axial displacement of the separating piston inside the space.

2. Vibration damper as claimed in claim 1, wherein in addition to the first valve and the second valve the bypass is provided with a hydraulic restrictor which is disposed hydraulically in parallel with the valves.

3. Vibration damper as claimed in claim 1, wherein the first valve is formed as a pressure limiting valve and comprises a substantially lower opening pressure than the second pressure limiting valve.

4. Vibration damper as claimed in claim 1, wherein the at least first pressure limiting valve and the at least second pressure limiting valve are formed as spring-loaded seat valves.

5. Vibration damper as claimed in claim 1, wherein the at least first pressure limiting valve and the at least second pressure limiting valve are formed as spring-loaded disc valves.

6. Vibration damper as claimed in claim 5, wherein the valves comprise a bypass disc which comprises one or several cut-outs and which with its cut-out or cut-outs comprise [sic] a defined restrictor openings [sic] to form a hydraulic restrictor which is permanently open for the damping fluid.

7. Vibration damper as claimed in claim 1, wherein the separating piston comprises elastic stop buffers on its axial end surfaces.

8. Vibration damper as claimed in claim 1, wherein stop discs which comprise stop surfaces for the separating piston are disposed inside the space which accommodates the separating piston.

* * * * *